Figure 1:
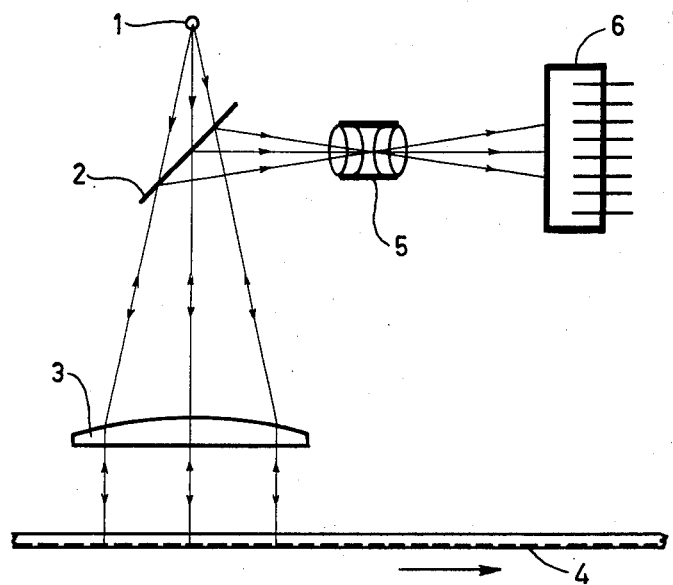

United States Patent [19]
Renes et al.

[11] 3,973,119
[45] Aug. 3, 1976

[54] DEVICE FOR DETERMINING THE DISPLACEMENT OF A MACHINE TOOL COMPONENT

[75] Inventors: Hendrik Renes; Joannes Gregorius Bremer, both of Eindhoven, Netherlands

[73] Assignee: U.S. Philips Corporation, New York, N.Y.

[22] Filed: Mar. 10, 1975

[21] Appl. No.: 556,820

[30] Foreign Application Priority Data
Mar. 15, 1974 Netherlands................ 7403468

[52] U.S. Cl............................. 250/231 R; 250/209; 250/237 G; 356/170
[51] Int. Cl.²..................................... G01B 11/04
[58] Field of Search........ 250/237 G, 231 R, 211 R, 250/208, 209; 356/170, 171, 172

[56] References Cited
UNITED STATES PATENTS

| | | |
|---|---|---|
| 3,096,441 | 7/1963 | Burkhardt................. 250/237 G X |
| 3,330,964 | 7/1967 | Hobrough et al............... 250/231 X |
| 3,394,248 | 7/1968 | Ogden......................... 235/237 G X |
| 3,578,979 | 5/1971 | Kawaguchi..................... 356/170 X |
| 3,600,588 | 8/1971 | Sayce............................ 250/211 R |
| 3,668,404 | 6/1972 | Lehovec..................... 250/237 G X |

*Primary Examiner*—Walter Stolwein
*Attorney, Agent, or Firm*—Frank R. Trifari; Simon L. Cohen

[57] ABSTRACT

A device is described for determining the linear displacement of a machine tool component with the aid of a grating which is mechanically connected to the component, which grating is disposed in the light path between a light source and a light-sensitive element which converts the incident light into an electric signal. The light-sensitive element is a multiple photo-cell which consists of a row of line-shaped photo-diodes which by means of an electrical switch are consecutively connected to an electronic circuit which processes the signal which is produced in the photo-diodes.

3 Claims, 2 Drawing Figures

U.S. Patent  Aug. 3, 1976  3,973,119

DEVICE FOR DETERMINING THE DISPLACEMENT OF A MACHINE TOOL COMPONENT

The invention relates to a device for determining the displacement of a machine-tool component with the aid of a grating which is mechanically connected to the component, which grating is disposed in the light path between a light source and a light-sensitive element which converts the incident light into an electric signal.

Such a device is known from U.S. Pat. No. 3,552,861. In the known device a uniformly moving reference grating, which is illuminated by the light source via a condenser, is projected on the grating which is mechanically connected to the component (measuring grating). In fact, the moving reference grating is formed by imaging a stationary auxiliary grating on the measuring grating via a polygon mirror which rotates with constant angular velocity. After passage through or reflection at the measuring grating the light beam is incident on a photo-cell. If the pitch of the projected grating equals that of the measuring grating and, moreover, the black-white ratio for the two gratings is exactly 1 : 1, the electric signal which is produced in the photo-cell is triangular as a function of time.

The known device has some drawbacks. First of all, the light which emerges from the light source is utilized only partly owing to various losses which are inevitable in practice. Secondly, the image of the reference grating on the measuring grating is of comparatively poor quality. In the third place, the polygon mirror, which must comply with stringent requirements, is an expensive component of the device. In the fourth place, the pitch of the projected grating is not perfectly equal to that of the measuring grating over the entire field of view.

It is an object of the invention to provide a device of the above-mentioned type which mitigates said drawbacks. For this, it is characterized in that the light-sensitive element is a multiple photo-cell which consists of a row of line-shaped substantially identical photo-sensitive elements, which are consecutively connected to an electrical circuit by an electrical switch, which circuit processes the signal which is produced in the photo-sensitive elements.

The device according to the invention neither includes an expensive polygon mirror nor a reference grating. Owing to the absence of the polygon mirror, it does not include any moving parts and is consequently highly vibration proof. The electrical switch ensures that a reference grating appears to travel over the surface of the multiple photo-cell.

The multiple photo-cell consists of a comparatively large number of photo-sensitive elements, which are arranged in a comparatively small number of groups. Thus, each group comprises a comparatively large number of elements. Each element of a group corresponds to one pitch of the measuring grating. As a result, a number of pitches equal to the number of elements in a group are scanned at the same time. Thus, a large field of view is obtained and, moreover, the electric signal to be read increases in proportion.

It is to be noted that the use of a multiplicity of photo-sensitive elements in a device for determining the linear displacement of a machine tool component is known. In said known device two gratings are illuminated by a light source in such a way that a Moire pattern is obtained which travels over the photo-sensitive elements. Furthermore it is to be noted that when a grating is imaged on a second grating, a Moire pattern being formed, it is known to provide the light-sensitive surface of a single photo-sensitive element with said second grating. In this last-mentioned and the preceding known case the required accuracy is not obtained because the pitch of a Moire pattern varies readily.

Figure 2:
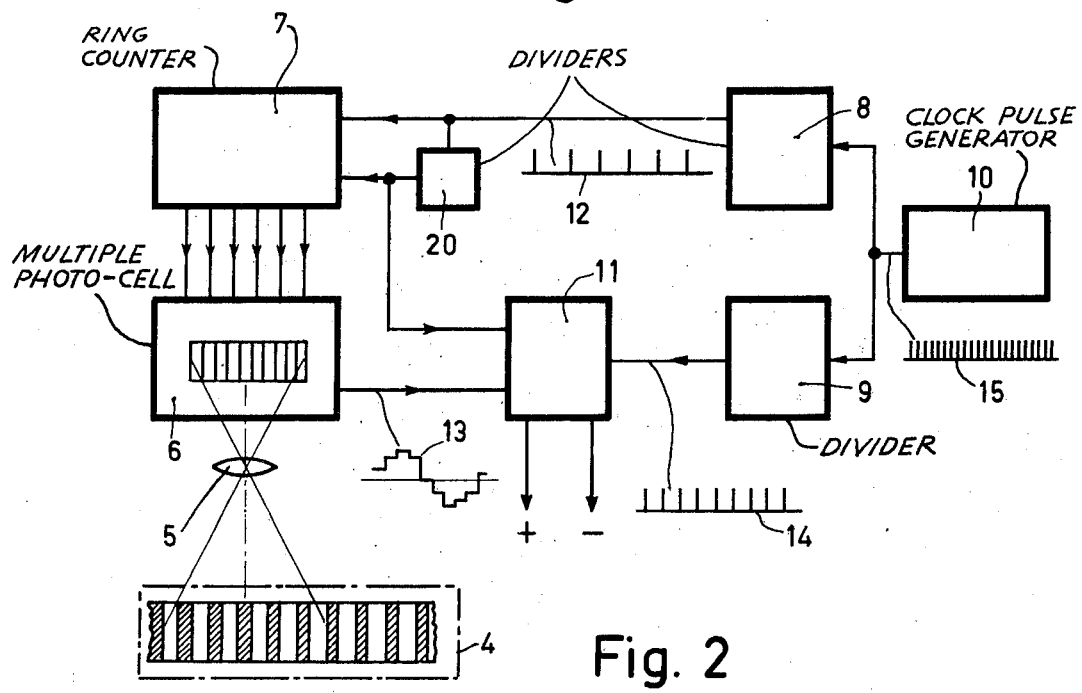

The invention will be described by way of example with reference to the drawing, in which FIG. 1 shows a device according to the invention, and FIG. 2 shows a block diagram of a circuit which is employed in the device of FIG. 1.

In the device of FIG. 1 the light source 1 projects a parallel light beam onto the measuring grating 4 via the semitransparent mirror 2. For this purpose the light source 1 is disposed in the focal plane of the field lens 3. The measuring grating 4 which (in a manner not shown) is connected to the machine tool component whose displacement is to be measured, moves in the direction indicated by an arrow. The measuring grating 4 is reflecting. The light which is reflected by the measuring grating is projected onto the multiple photo-cell 6 via the field lens 3, the semi-transparent mirror 2 and the objective 5.

The multiple photo-cell 6 consists of a row of line-shaped photo-diodes. The number of photo-diodes per pitch of the projected grating 4 should be as large as possible for an as accurate as possible electrical reproduction of the optical signal. On the other hand, an as large as possible part of the measuring grating 4 must be scanned in order to minimize errors owing to for example transitions in grating sections, grating contamination etc. In one embodiment the number of photo-cells was 180 and the length of each photo-cell was 1.8 mm. The width of each photo-cell was 0.01 mm and the mutual spacing of the photo-cells was also 0.01 mm. The number of ordered photo-diodes per pitch of the measuring grating 4 was 6 ordered photodiodes, so that the field of view covered 30 grating pitches. (The selected number of photo-diodes per pitch may alternatively be 5 or 10. The field of view then covers 36 or 18 grating pitches respectively.) Corresponding ordered photo-diodes of each group of 6 consecutive photo-diodes were interconnected, which means that there were 6 groups of ordered photo-diodes.

A stationary grating with a black-white ratio of 1 : 1 in the area of the multiple photo-cell 6 is simulated by sequentially activating three consecutive groups of photodiodes (three groups of 30 photo-diodes in the embodiment). A travelling grating is obtained when the set of the groups, is activated each time skipping one group.

FIG. 2 shows the block diagram of the processing electronics. The clock pulses 15 which are generated in the clock pulse generator 10 are applied to the divider 8 and the divider 9. The divider 8 supplies pulses 12 which drive the ring counter 7. The multiple photo-cell 6, on which the measuring grating 4 is projected via the lens 5, is activated by the ring counter 7 and produces the measuring signal 13. The divider 9 supplies pulses 14 (generally of a different repetition frequency than the drive pulses 12 from the divider 8), which form the reference signal. In the buffer counter 11 the measuring signal 13 and the reference pulses are compared with each other. The output pulses of the buffer counter 11 are for example applied to an indicator.

The ring counter 7 activates the consecutive groups of photo-cells of the multiple photo-cell 6, so that apparently a grating travels over the surface of the photo-cell 6 with constant speed. The pitch of said grating equals that of the projection of the measuring grating 4 on the photo-cell 6. When the grating 4 is stationary relative to the photo-cell 6, the measuring signal 13 will have a constant frequency. When the projection of the measuring grating 4 moves in the same direction as the apparent grating which is activated by the ring counter 7, the frequency of the measuring signal 13 decreases, while in the case of movement in the opposite direction the frequency of the measuring signal 13 increases. Thus, the direction and magnitude of the displacement of the measuring grating 4 can be determined.

Within a range of one pitch of the measuring grating 4 the position of the multiple photo-cell 6 relative to the grating 4 can be determined in an absolute manner by measuring the difference in phase between the measuring signal 13 and the reset signal of the ring counter 7. The ring counter 7 must be reset upon each start of the measurements in order to guarantee that the counter 11 starts to count from a definite initial state.

However, the circuit becomes simpler and more reliable when the ring counter 7 is reset after each period. The reset signal is produced in the divider 20 by dividing the pulses 12. The frequency of the reset pulses is selected to equal the nominal frequency of the measuring signal 13.

What is claimed is:

1. A device for determining the displacement of a machine tool component, comprising a periodic grating mechanically attached to the component, a radiation source means for projecting radiation onto said grating, a plurality of aligned photo-cells arranged sequentially in ordered groups of at least two photo-cells, means for projecting an image of a portion of the grating onto said photo-cells, each period of said projected grating image spanning one of said groups of said photo-cells, and interrogating means for periodically sequentially activating the photo-cells in each of said ordered groups of photo-cells and for simultaneously activating each of the photo-cells of an activated order, whereby a plurality of photo-cells having substantially the same spacing as the period of said grating image are simultaneously activated and whereby the location of said activated photo-cells periodically shifts in a predetermined direction.

2. A device as recited in claim 1, wherein said interrogating means comprises a clock pulse generator, a ring counter connected to said clock pulse generator, means connecting said ring counter to said photo-cells, said device further comprising a counting device connected to the output of said photo-cells and to said clock pulse generator for comparing said clock pulses with the output of said photo-cells.

3. A device as recited in claim 2, wherein said device further comprises a divider means for periodically simultaneously providing reset pulses to said ring counter and to said counting device after a predetermined number of clock pulses are applied to said ring counter and to said counting device.

* * * * *